United States Patent
Kamiwada et al.

[11] Patent Number: 6,031,536
[45] Date of Patent: Feb. 29, 2000

[54] THREE-DIMENSIONAL INFORMATION VISUALIZER

[75] Inventors: Toru Kamiwada, Akashi; Shinta Kimura, Kobe, both of Japan

[73] Assignee: Fujitsu Limited, Kawasaki, Japan

[21] Appl. No.: 09/013,535

[22] Filed: Jan. 26, 1998

[30] Foreign Application Priority Data

Jul. 28, 1997 [JP] Japan .................................. 9-201560

[51] Int. Cl.[7] .............................. G06F 3/00; G06T 17/00
[52] U.S. Cl. ........................ 345/355; 345/357; 345/978; 345/427
[58] Field of Search .................... 345/355, 419, 345/357, 427, 978, 326, 348, 354, 330

[56] References Cited

U.S. PATENT DOCUMENTS

| | | | |
|---|---|---|---|
| 5,347,306 | 9/1994 | Nitta ........................................ | 345/302 |
| 5,488,686 | 1/1996 | Murphy et al. ........................ | 345/330 |
| 5,731,813 | 3/1998 | O'Rourke et al. .................... | 345/356 |
| 5,748,191 | 5/1998 | Rozak et al. .......................... | 345/978 |
| 5,767,855 | 6/1998 | Bardon et al. ......................... | 345/355 |
| 5,808,613 | 9/1998 | Marrin et al. .......................... | 345/355 |
| 5,808,614 | 9/1998 | Nagahara et al. ..................... | 345/355 |
| 5,812,134 | 9/1998 | Pooser et al. ......................... | 345/355 |

*Primary Examiner*—Raymond J. Bayerl
*Assistant Examiner*—Sy D. Luu
*Attorney, Agent, or Firm*—Staas & Halsey LLP

[57] ABSTRACT

A three-dimensional information visualizer for displaying a logical three-dimensional space on a display device for two-dimensional images, in which a user can by virtual reality move in the logical three-dimensional space and read information displayed on the logical three-dimensional space, includes a registration instruction input receiving part for receiving from a user an input for instructing to register a bookmark, a storage device for storing one or a plurality of sets of information indicating a position of the user in the logical three-dimensional space and information indicating a sight line orientation of the user in the logical three-dimensional space as bookmark information, an information acquiring part for acquiring the bookmark information at a time when the registration instruction input receiving part receives an input, and a registering part for registering information acquired by the information acquiring part in the storage device.

13 Claims, 12 Drawing Sheets

| name | voice pattern | |
|---|---|---|
| name 1 | pattern 1 | 〜〜 |
| name 2 | pattern 2 | 〜〜 |
| name 3 | pattern 3 | 〜〜 |
| ⋮ | ⋮ | |

FIG. 7

| name | snapshot | |
|---|---|---|
| name 1 | snap 1 | [image] |
| name 2 | snap 2 | [image] |
| name 3 | snap 3 | [image] |
| ⋮ | ⋮ | |

FIG. 8

THREE-DIMENSIONAL INFORMATION VISUALIZER

FIELD OF THE INVENTION

The present invention relates to a three-dimensional information visualizer for displaying a logical three-dimensional space on a display device displaying two-dimensional images, in which a user moves in the logical three-dimensional space and retrieves information therefrom. The present invention also relates to a recording medium which can be read by a computer, the recording medium storing programs for operating the computer.

BACKGROUND OF THE INVENTION

In recent years, a three-dimensional information visualizer displaying a logical three-dimensional space on a screen of a personal computer or the like, in which a user can take a walk in the logical three-dimensional space displayed on the screen by manipulating an input device such as a mouse or a keyboard, has been put to practical use. The following examples are commonly utilized: a device which three-dimensionally displays an image of a shopping mall on the screen so that the user feels as if he or she was actually shopping on the screen; and a visualizer in which images of books are three-dimensionally placed and the user can visualize the content of the book he desires to read by double-clicking the image of the book.

On the other hand, more and more users read information stored in servers located all over the world via the internet in recent years. For example, in a system called "World Wide Web" (hereinafter, referred to as "WWW"), information which is created by users on the servers (referred to as "Web pages" or simply "pages") can be retrieved and read via communication lines all over the world.

The information on pages is written in a language called Hypertext Markup Language (abbreviated as HTML), so that a special software called a browser is used for interpreting the written information so as to display the information on the screen. A well-known example of such a browser is Netscape Navigator (brand name) manufactured by Netscape Communications Corporation.

The Netscape Navigator is provided with a bookmark function. The bookmark function refers to a function by which, in the case where a user reads information on a certain Web page, the read page is registered as a bookmark, and after the user has moved to another page, the user can immediately return to a desired page by designating the registered bookmark.

The identification assigned to each of the Web pages is referred to as "Uniform Resource Locator (hereinafter, referred to as URL)", and the user can designate a desired page by designating the URL. However, the operation of inputting the URL is often troublesome.

The bookmark function realizes easy access to a page which has already been read, without performing the input of the URL every time the user desires to read the page, thus significantly improving operability of the browser.

However, the above-mentioned bookmark function simply accumulates the URLs of the pages which are registered as the bookmarks in the order of the registration. Therefore, for example, in the case where it is desired to collectively display the URLs of pages containing similar information in a bookmark listing area, it is necessary for the user to perform an operation of reordering the bookmarks. More specifically, it is necessary to reorder the bookmarks so as to manage the URLs of the pages containing similar information as one group, or the like. This operation is excessively troublesome, when the number of the registered bookmarks is large.

On the other hand, it is possible to supply a browser which can be more easily utilized by ordinary people by introducing the technique of the three-dimensional information visualizer described earlier.

SUMMARY OF THE INVENTION

A three-dimensional information visualizer for displaying a logical three-dimensional space on a display device for two-dimensional images, in which a user can by virtual reality move in the logical three-dimensional space and read information displayed on the logical three-dimensional space, according to the present invention includes registration instruction input receiving means for receiving from a user an input for instructing to register a bookmark, storing means for storing one or a plurality of sets of information indicating a position of the user in the logical three-dimensional space and information indicating a sight line orientation of the user in the logical three-dimensional space as bookmark information, information acquiring means for acquiring the bookmark information at a time when the registration instruction input receiving means receives an input, and registering means for registering information acquired by the information acquiring means in the storing means.

In one embodiment of the invention, the three-dimensional information visualizer further includes means for comparing information acquired by the information acquiring means with bookmark information already stored in the storing means, when the registration instruction input receiving means receives an input. The registering means does not perform registration to the storing means, when the result from the comparison by the comparing means indicates that the difference between bookmark information already existing in the storing means and the information acquired by the information acquiring means is within a predetermined range.

In another embodiment of the invention, the three-dimensional information visualizer further includes registration confirming means for asking the user for instructions whether or not to perform registration to the storing means, when the result from the comparison by the comparing means indicates that the difference between bookmark information already existing in the storing means and the information acquired by the information acquiring means is within a predetermined range, and registration instruction input receiving means for receiving an input of instruction of the user in response to the asking by the registration confirming means. The registering means performs registration to the storing means, when the registration instruction input receiving means receives an input for instructing to register.

In still another embodiment of the invention, the three-dimensional information visualizer further includes restoration instruction input receiving means for receiving from a user an input for instructing to restore a state which is registered as a bookmark, retrieving means for retrieving bookmark information from the storing means, when the restoration instruction input receiving means receives the input, and view restoring means for restoring a view as viewed by a user in the logical three-dimensional space on a display device at a time when the user performed registration of the bookmark, the restoration of the view being based on information retrieved by the retrieving means.

In yet another embodiment of the invention, the storing means further stores identifiers of users as information concerning a bookmark. The retrieving means retrieves bookmark information, in a case where an identifier of a user instructing registration of the bookmark matches an identifier of a user instructing restoration.

In another embodiment of the invention, the registration instruction input receiving means receives from a user an input of a bookmark identifier particular to a bookmark to be registered. The restoration instruction input receiving means further receives from the user an input of a bookmark identifier representing a view to be restored.

In still another embodiment of the invention, the three-dimensional information visualizer further includes voice information storing means for storing voice information representing a received voice, in a case where the registration instruction input receiving means receives a voice as an input for instructing to register a bookmark, voice information registering means for registering the voice information representing the voice in the voice information storing means.

In yet another embodiment of the invention, the three-dimensional information visualizer further includes voice information searching means for searching whether or not information matching or similar to the voice information representing a received voice is stored in the voice information storing means, in a case where the restoration instruction input receiving means receives a voice as an input for instructing restoration. The retrieving means retrieves bookmark information corresponding to the matching or similar information, in a case where the matching or similar information is searched by the voice information searching means.

In another embodiment of the invention, the three-dimensional information visualizer further includes snapshot storing means for storing information representing an output to a display device at a time when the registration instruction input receiving means receives an input for instructing registration, snapshot registering means for registering the information representing the output in the snapshot storing means, when the registration instruction input receiving means receives the input, snapshot list displaying means for displaying a list of information stored in the snapshot storing means on the display device, and selection input receiving means for receiving from a user an input for selection of information to be restored from the list of information.

Another aspect of the present invention provides a recording medium readable by a computer storing a program for a three-dimensional information visualizer for displaying a logical three-dimensional space on a display device for two-dimensional images, in which a user can by virtual reality move in the logical three-dimensional space and read information displayed on the logical three-dimensional space. The program allows the computer to execute a registration instruction input receiving process for receiving from a user an input for instructing to register a bookmark, an information acquiring process for acquiring information indicating a position of the user in the logical three-dimensional space and information indicating a sight line orientation of the user in the logical three-dimensional space at a time when an input is received at the registration instruction input receiving process, and a process of registering information acquired by the information acquiring process in storing means capable of storing one or a plurality of sets of the information.

Thus, the invention described herein makes possible the advantages of (1) providing a three-dimensional information visualizer capable of easily managing bookmarks, and (2) providing a recording medium readable by a computer storing programs for operating the computer.

These and other advantages of the present invention will become apparent to those skilled in the art upon reading and understanding the following detailed description with reference to the accompanying figures.

BRIEF DESCRIPTION OF THE DRAWINGS

FIG. 7 is a view illustrating exemplary voice pattern information in a three-dimensional information visualizer of the present invention.

FIG. 8 is a view illustrating exemplary snapshot information in a three-dimensional information visualizer of the present invention.

DESCRIPTION OF THE PREFERRED EMBODIMENTS

Hereinafter, the present invention will be described by way of examples with reference to the accompanying drawings.

Figure 1:
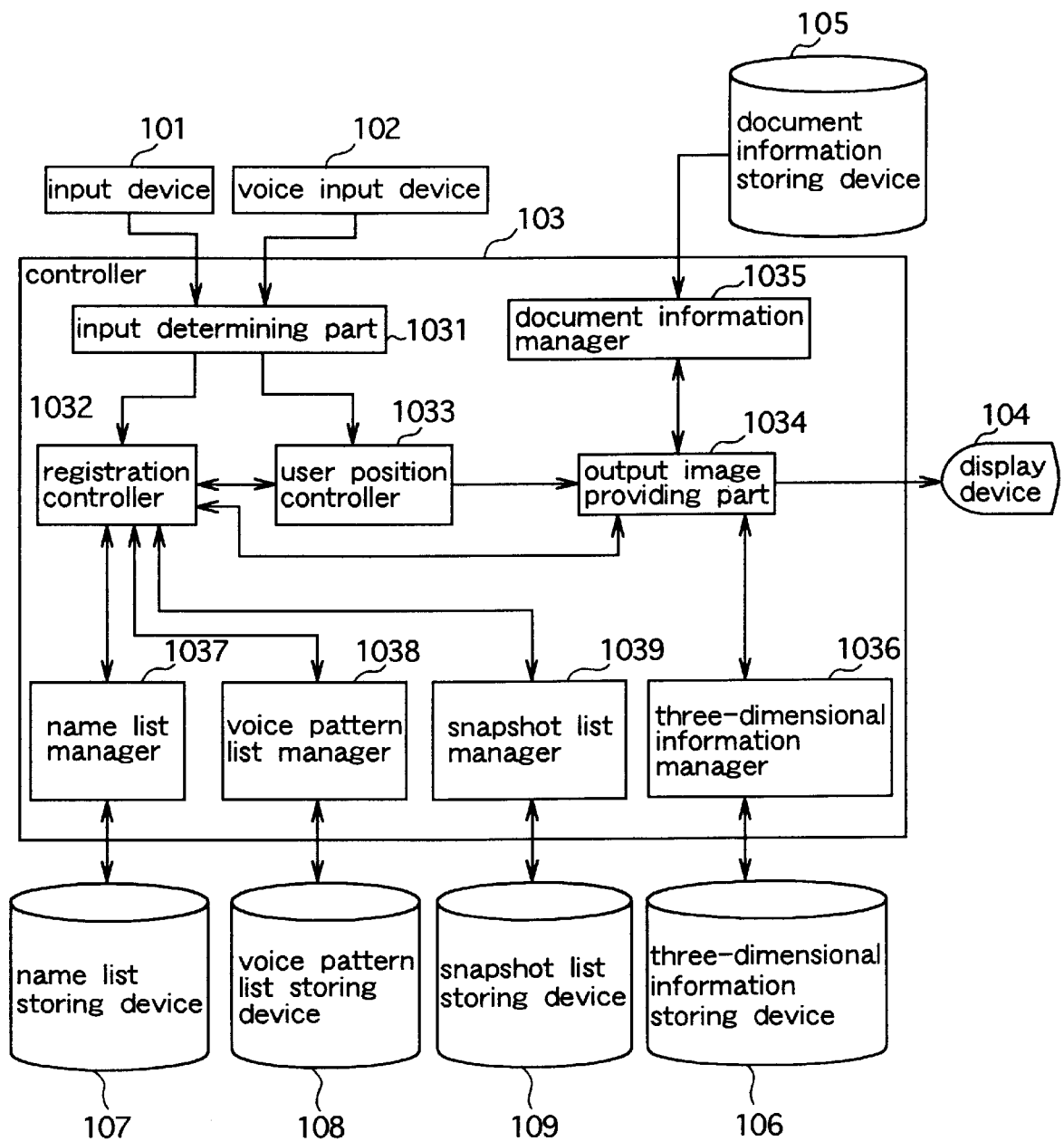
FIG. 1 is a functional block diagram illustrating a structure of a three-dimensional information visualizer according to one embodiment of the present invention.

FIG. 1 is a functional block diagram illustrating a structure of a three-dimensional information visualizer according to one embodiment of the present invention.

As shown in FIG. 1, the three-dimensional information visualizer of this embodiment includes an input device 101, a voice input device 102, a controller 103, a display device 104, a document information storing device 105, a three-dimensional information storing device 106, a name list storing device 107, a voice pattern list storing device 108, and a snapshot list storing device 109.

Furthermore, the controller 103 includes an input determining part 1031, a registration controller 1032, a user position controller 1033, an output image providing part 1034, a document information manager 1035, a three-dimensional information manager 1036, a name list manager 1037, a voice pattern list manager 1038, and a snapshot list manager 1039.

The input device 101 can be used to supply instructions to the three-dimensional information visualizer. More specifically, it is possible to use an input device such as a mouse, a hardware keyboard, a software keyboard, or the like.

The voice input device 102 receives a voice input from the user. More specifically, an input device capable of receiving a voice signal such as a microphone or the like can be used.

The controller 103 controls the entire three-dimensional information visualizer of this embodiment. In addition, the controller 103 retrieves necessary information from the document information storing device 105, the three-dimensional information storing device 106, the name list storing device 107, the voice pattern list storing device 108, and the snapshot list storing device 109 in accordance with an input from the input device 101, so as to generate image data and output to the display device 104.

The display device 104 displays the image data supplied from the controller 103. A specific example of the display device 104 is an output device such as a display device.

In the case where, for example, only a header of a document is displayed in the logical three-dimensional space, detailed document information corresponding to the header and the content of the document are stored in the document information storing device 105. Storing the contents is performed with another program or the like.

In the three-dimensional information storing device 106, information for displaying the logical three-dimensional space is stored. Storing the contents is performed with another program or the like.

In the name list storing device 107, information concerning a bookmark (hereinafter, referred to as "name information") is stored by the control of the controller 103.

Figure 6:
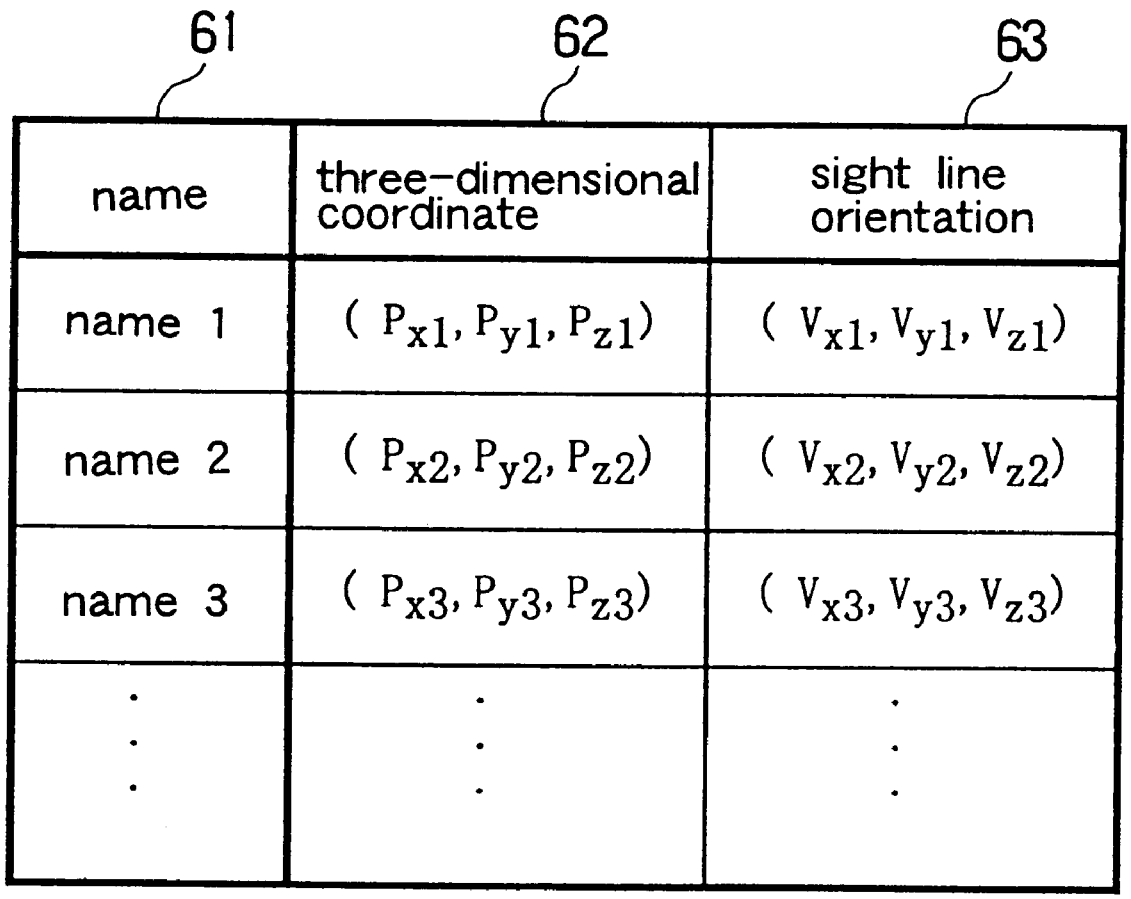
FIG. 6 is a view illustrating a data structure of name information in a three-dimensional information visualizer of the present invention.

FIG. 6 is a view illustrating a data structure of the name information in this embodiment. As shown in FIG. 6, the name information 61 includes at least coordinates 62 of a position at which a user stands in the logical three-dimensional space, and information 63 concerning a vector representing the orientation of the line of sight from the position at the time of bookmark registration.

Each name information 61 is stored having a name assigned for every entry as a key. Each name, for example, can be designated by the user operating a software keyboard, which is provided as the input device 101, as described later. However, in the case where there is no input for designation from the user, the registration controller 1032 automatically generates the name.

In the voice pattern list storing device 108, voice pattern information is stored. The voice pattern information is intended to contain a waveform pattern of input voice information in the case where an input of an identifier indicating a bookmark is performed by using a voice at the time of the registration of the bookmark. In this case, the name is automatically generated by the registration controller 1032.

FIG. 7 is a view illustrating exemplary voice pattern information in this embodiment. As shown in FIG. 7, as the voice pattern information, at least a name and a waveform pattern of voice information input from the voice input device 102 are stored having the name as the key. In this embodiment, for the sake of convenience, the waveform pattern 71 is shown in the form seen in FIG. 7. However, the waveform pattern 71 can be stored, for example, as an 8 bit monophonic PCM-signal with a sampling rate of 22,050 Hz. Alternatively, other forms using a 16 bit signal, a stereophonic signal, a $\mu$-law-signal, or a different sampling rate are possible.

In the snapshot list storing device 109, snapshot information is stored. The snapshot information refers to information concerning a view displayed on the screen at the position registered as a bookmark.

FIG. 8 is a view illustrating exemplary snapshot information. As shown in FIG. 8, names and snapshots 81 displayed on the screen in the display device 104 at the time of bookmark registration are stored as snapshot information having the names as the keys. As the snapshots 81, for example, the image displayed on the screen in the display device 104 at the time of registration can be stored as it is in the bitmap form, or can be stored in other forms. Furthermore, the snapshots can be stored in a reduced size at the time of storage, or can be stored as they are without being reduced in size and displayed on the screen in a reduced size at the time of display.

Next, a specific process procedure for each component in the controller 103 will be described.

The input determining part 1031 determines whether the input from the input device 101 is an input indicating a move in the logical three-dimensional space, an input indicating registration of a bookmark, or an input indicating restoration of a view registered as a bookmark.

In the case where the input determining part 1031 determines that the input from the input device 101 is an input indicating registration of a bookmark or an input indicating restoration of a view registered as a bookmark, the registration controller 1032 instructs the name list manager 1037 to store or retrieve the name information. Furthermore, in the case where the input indicates the restoration of a view registered as a bookmark, the registration controller 1032 supplies the name information and other information necessary for displaying messages or the like to the user to the output image providing part 1034.

On the other hand, in the case where the input determining part 1031 determines that the input indicates the registration of the bookmark, the registration controller 1032 receives the information of the coordinates of the present position of the user in the logical three-dimensional space and the vector information of the orientation of the line of sight from the user position controller 1033 so as to supply the name information to the name list manager 1037 with instructions to store the name information to the name list storing device 107.

In the case where the input from the input device 101 is an input indicating a move in the logical three-dimensional space, the user position controller 1033 calculates coordinates of a destination position and a vector representing an orientation of the line of sight, and supplies instructions to the output image providing part 1034 so as to display an appropriate image on the display device 104.

In response to the instructions from the user position controller 1033 or the registration controller 1032, the output image providing part 1034 supplies instructions to the document information manager 1035 and the three-dimensional information manager 1036 so as to retrieve necessary information from the document information storing device 105 and the three-dimensional information storing device 106. Then the output image providing part 1034 generates image data to display an image on the display device 104, in accordance with retrieved information.

In response to the instructions from the output image providing part 1034, the document information manager 1035 retrieves document information from the document information storing device 105.

The three-dimensional information manager 1036 retrieves three-dimensional information from the three-dimensional information storing device 106, in response to the instructions from the output image part 1034.

The name list management controller 1037, as described above, stores and retrieves name information to and from the name list storing device 107, in response to the instructions from the registration controller 1032.

The voice pattern list manager 1038 stores and retrieves voice pattern information to and from the voice pattern list storing device 108, in response to the instructions from the registration controller 1032.

The snapshot list manager 1039 stores and retrieves snapshot information to and from the snapshot list storing device 109, in response to the instructions from the registration controller 1032.

Next, a process procedure of the controller 103 including the above-mentioned components will be described in detail.

Figure 2:
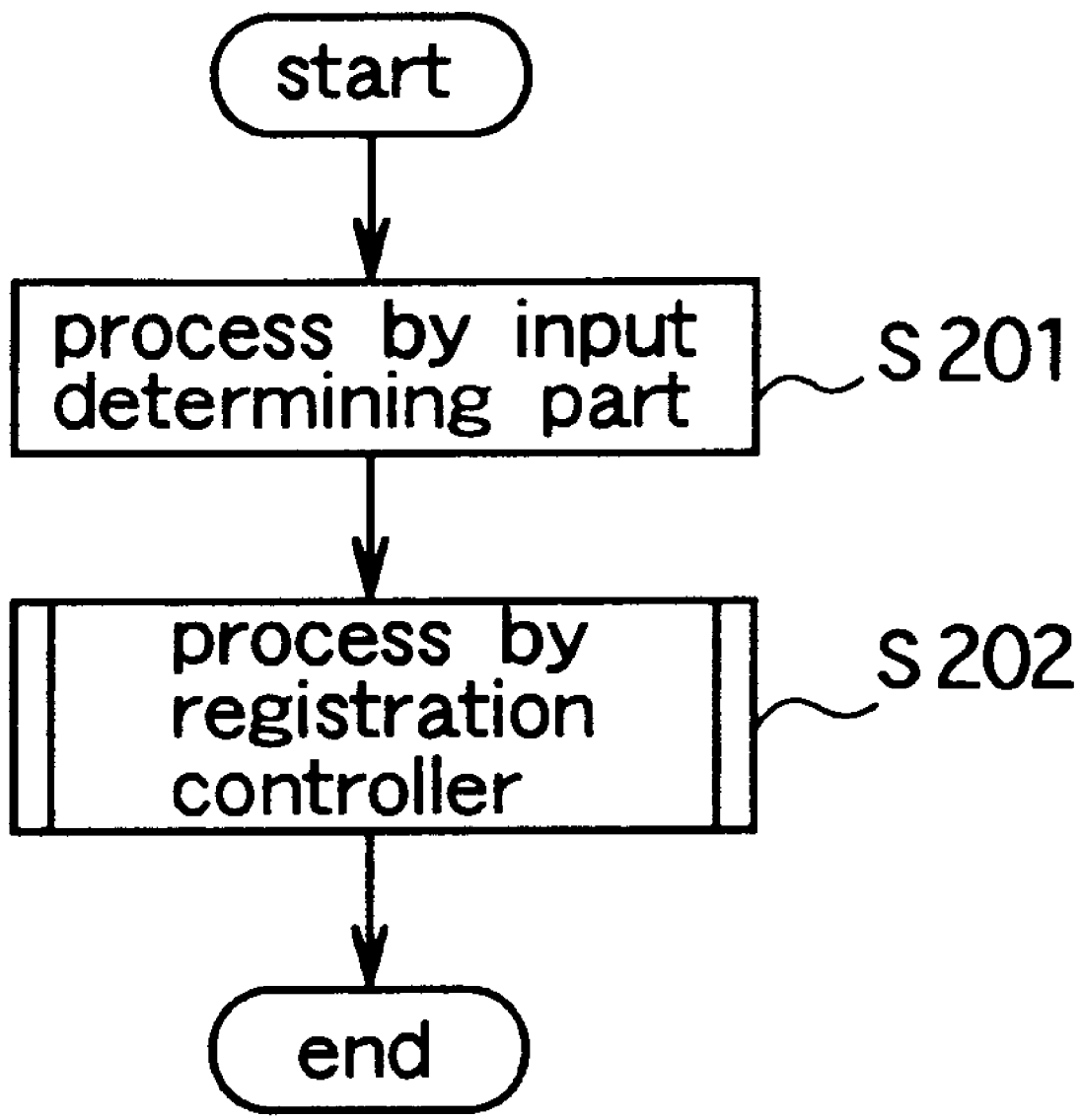
FIG. 2 is a flow chart illustrating a process procedure of a controller in a three-dimensional information visualizer of the present invention.

FIG. 2 is a flow chart illustrating a process procedure of the controller 103 in the three-dimensional information visualizer of this embodiment, in the case where the input device 101 receives an input indicating the registration of a bookmark, or an input indicating the restoration of the view registered as a bookmark.

Hereinafter, a basic concept for a method for registering the bookmark in the three-dimensional information visualizer of the present invention will be described.

When registering a view in the logical three-dimensional space as a bookmark, if a view containing an area where a header of a document of interest is displayed is already registered as the bookmark, it is not necessary to register the view once again, even if the position of the user and the line of sight are slightly different. When newly registering a bookmark, the three-dimensional information visualizer eliminates the repetition of the registration of the bookmark by comparing with the bookmarks already registered. This makes it easy to manage the bookmarks, and thus the three-dimensional information visualizer of the present invention is effective in saving space for storage necessary for storing the bookmark.

As described above, the three-dimensional information visualizer of this embodiment determines whether or not the view of interest is similar to the view already registered as the bookmark, using a criterion whether or not the position of the user in the logical three-dimensional space and the orientation of the line of sight at the moment are within a predetermined range. More specifically, it is determined whether or not to register the bookmark once again, using the following formula 1:

$$\vec{dn} = \left(\vec{Pn} + \frac{L}{|\vec{en}| \cdot \vec{en}}\right) - \left(\vec{P} + \frac{L}{|\vec{e}| \cdot \vec{e}}\right) \quad \text{(Formula 1)}$$

In Formula 1, P is a vector representing the present position, and e is the orientation of the present line of sight. In the three-dimensional information visualizer of the present embodiment, first, a vector sum of a vector having a length of L parallel to the vector e and the vector P is obtained. Furthermore, one vector (the position thereof is represented by a vector $P_n$, and the sight line orientation by a vector $e_n$) is taken from the registered bookmarks, and a vector sum thereof is obtained in the same manner. A vector gap $d_n$ of the two obtained vector sums is obtained. Then, depending on whether or not the vector gap $d_n$ is within a predetermined threshold value, it is determined whether or not to register the bookmark.

Figure 9:
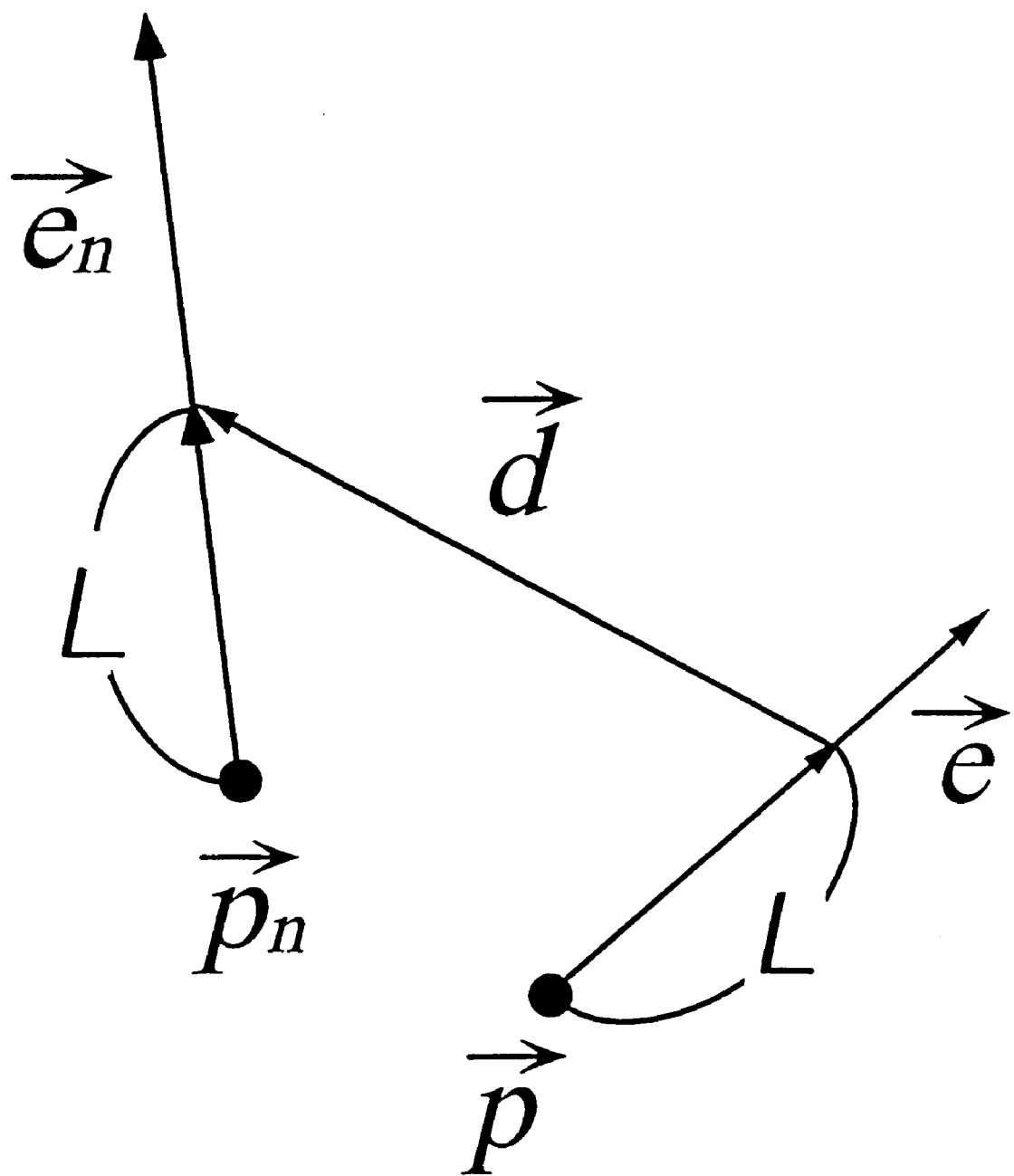
FIG. 9 is a schematic view for illustrating calculation of a vector gap in a three-dimensional information visualizer of the present invention.

FIG. 9 shows a schematic view of the vector gap described above. A value of the threshold value $d_0$ can be freely set depending on the purpose of use or the content of three-dimensional information, and can be dynamically changeable.

Hereinafter, based on the concept described above, a detailed process procedure in registering the bookmark will be described with reference to flow charts.

As shown in the flow chart of FIG. 2, in the case where the controller 103 receives an input from the input device 101, the content of the input is determined by the input determining part 1031 (S201).

For the registration of a bookmark, the content of the input is instructions for the registration of the bookmark. In this case, the input determining part 1031 notifies the registration controller 1032 that such instruction has been input, so that the procedure moves to a process by the registration controller 1032 (S202).

Figure 3:
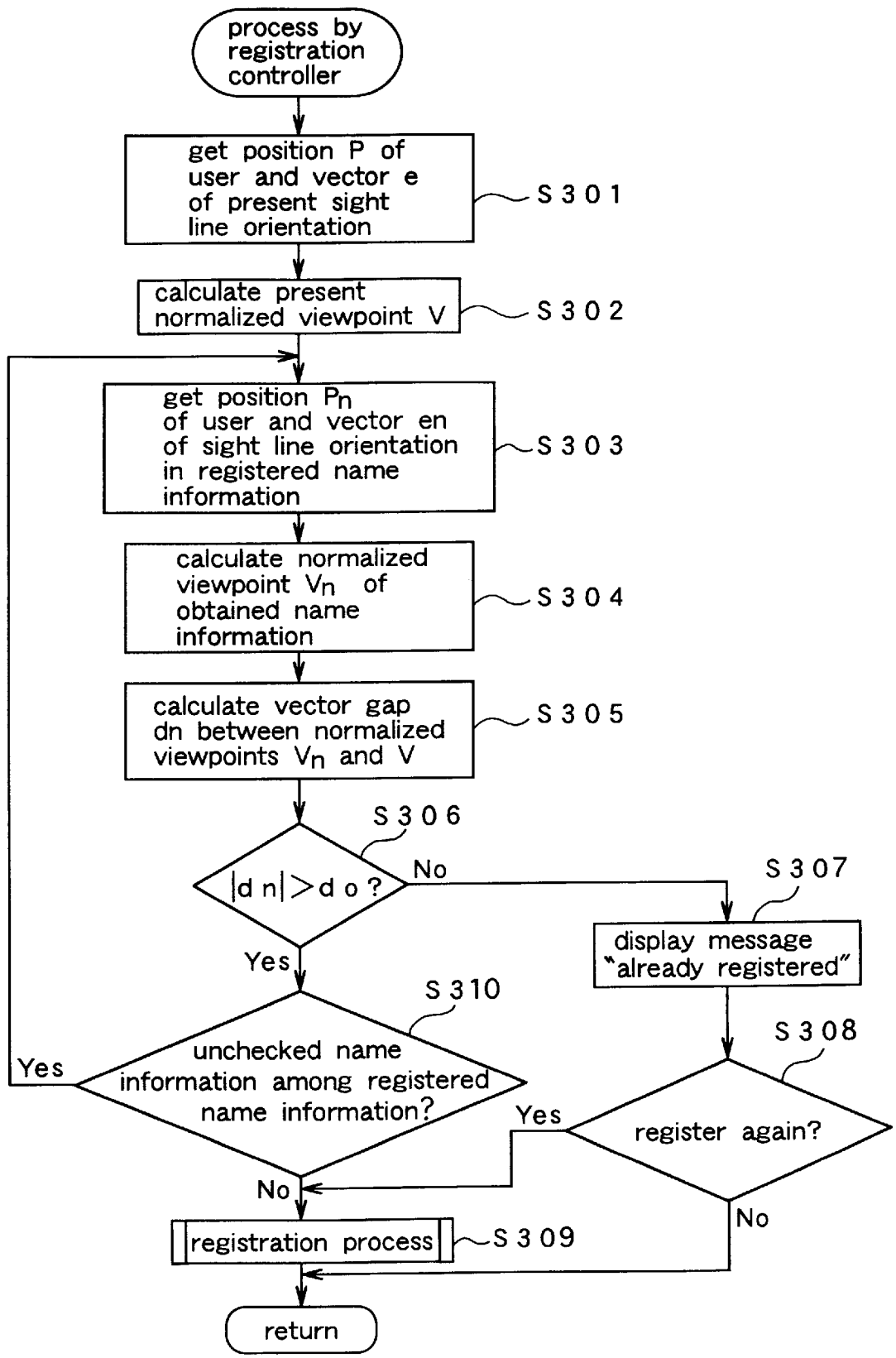
FIG. 3 is a flow chart illustrating a detailed description of a process by a registration controller, in the case where instructions to register a bookmark have been input in a three-dimensional information visualizer of the present invention.

FIG. 3 is a flow chart illustrating a detailed procedure of the process by the registration controller 1032, in the case where the registration of the bookmark is instructed.

As shown in FIG. 3, the registration controller 1032 first gets the vector P representing the position of the user in the logical three-dimensional space at that moment and the vector e representing the orientation of line of sight from the user position controller 1033 (S301).

Then, the registration controller 1032 calculates the present normalized viewpoint V from the information obtained at S301 (S302). The normalized viewpoint V refers to a point which is calculated with the following formula 2:

$$\vec{V} = \vec{P} + \frac{L}{|\vec{e}|} \cdot \vec{e} \quad \text{(Formula 2)}$$

Thereafter, the registration controller 1032 acquires one of the names registered in the name information (S303), and calculates a normalized viewpoint Vn in the obtained name information from the vector $P_n$ representing the position of the user and the vector $e_n$ representing the orientation of the line of sight in the acquired name information (S304). The normalized viewpoint Vn is calculated with the following formula 3:

$$\vec{Vn} = \vec{Pn} + \frac{L}{|\vec{en}|} \cdot \vec{en} \qquad \text{(Formula 3)}$$

Next, the registration controller 1032 calculates the vector gap $d_n$ between the obtained normalized viewpoint Vn and the normalized viewpoint V, so as to compare the bookmark which the user is registering with the bookmarks already registered. More specifically, first, the vector gap $d_n$ is calculated with the following formula 4 (S305):

$$\vec{dn} = \vec{Vn} - \vec{V} \qquad \text{(Formula 4)}$$

The registration controller 1032 compares the obtained vector gap $d_n$ with a predetermined threshold value $d_0$ (S306). In the case where the size of the vector gap $d_n$ is not greater than the predetermined threshold value $d_0$ (S306: No), it is determined that registering the bookmark the user desires to register is duplicating a bookmark which is already registered, and a message "already registered" is displayed in order to notify the user that the bookmark is already registered before the user performs the registration (S307).

If a subsequent input by the user indicates instruction of registration in spite of duplication (S308: Yes), the registration controller 1032 goes to the registration process (S309). In the case where the input indicates no need of registration (S308: No), subsequent processes are not performed.

In the above-mentioned procedure, in the case where the user instructs registration of the bookmark in spite of duplication, or in the case where the size of the vector gap is larger than the predetermined threshold value $d_0$ for all the already-registered bookmarks (S310: No), the registration controller 1032 goes to the registration process (S309).

Figure 4:
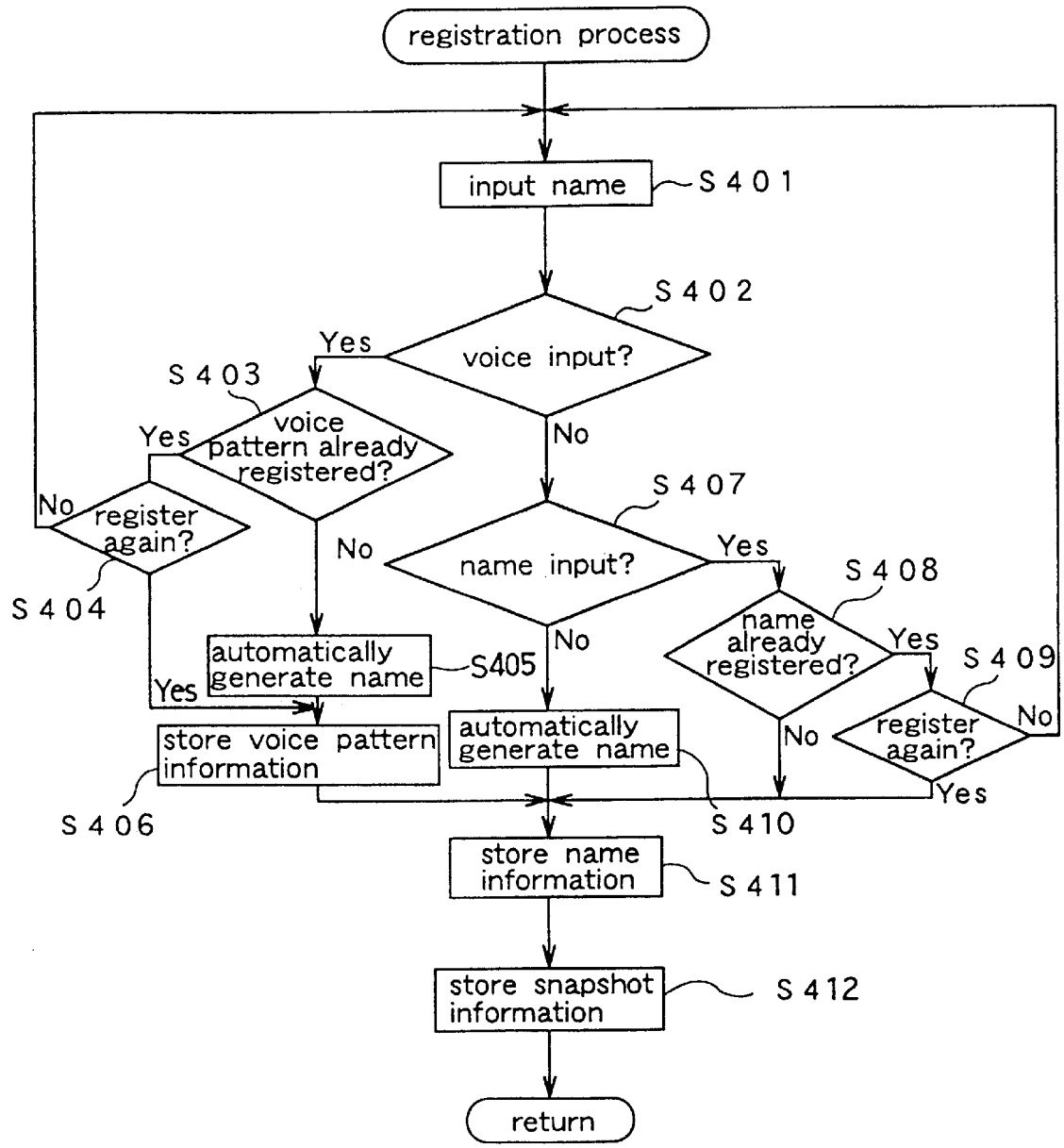
FIG. 4 is a flow chart illustrating a detailed description of a process by a registration controller to perform registration of a bookmark in a three-dimensional information visualizer of the present invention.
Figure 10:
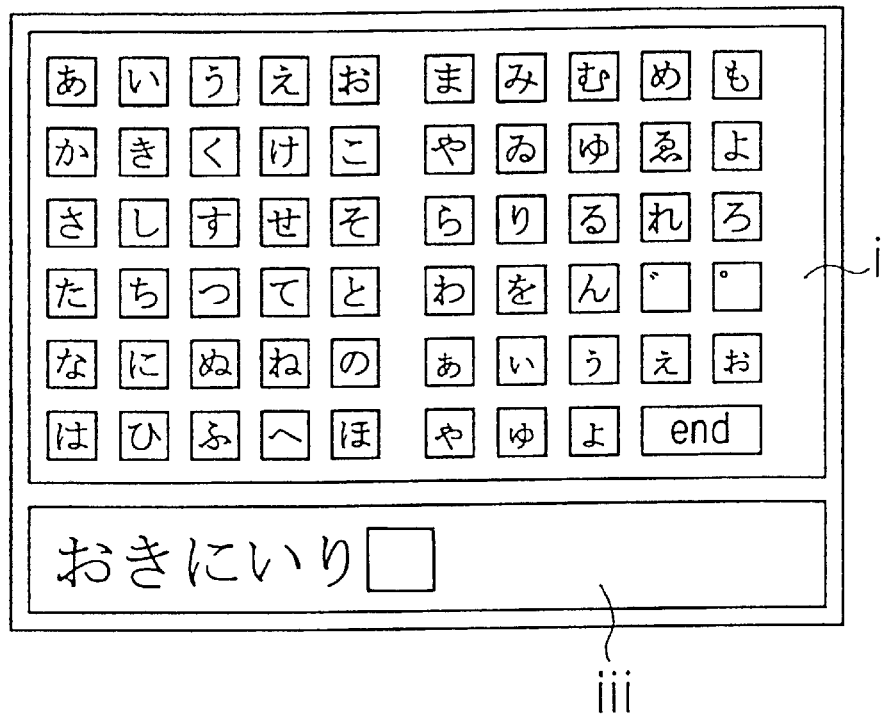
FIG. 10 is a view illustrating an exemplary software keyboard displayed on a display device in a three-dimensional information visualizer of the present invention.
Figure 11:
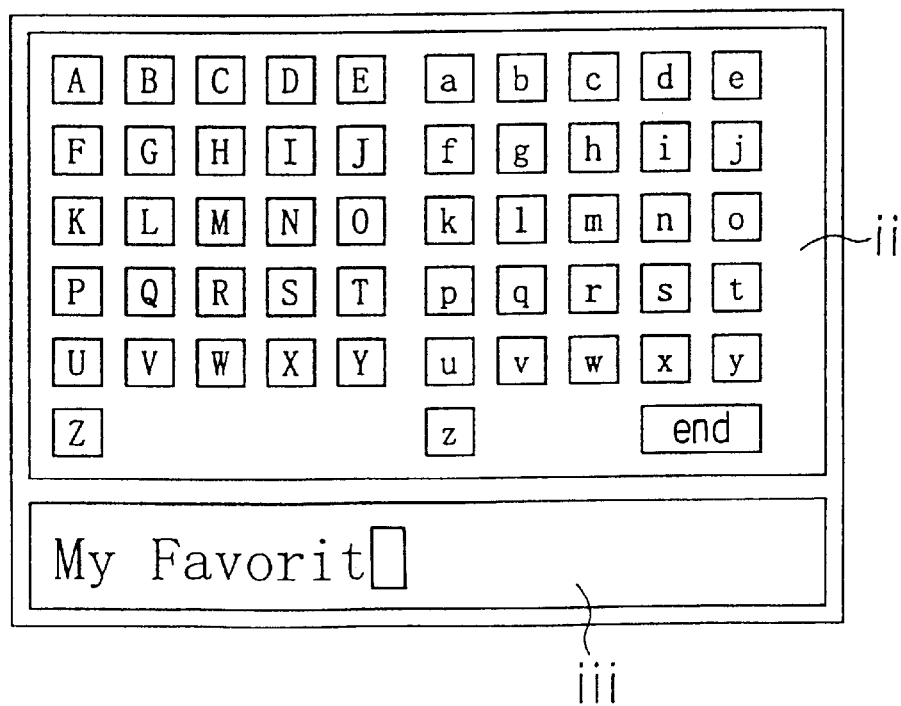
FIG. 11 is a view illustrating another exemplary software keyboard displayed on a display device in a three-dimensional information visualizer of the present invention.

FIG. 4 is a flow chart illustrating a detailed process procedure of the registration controller 1032 in the registration process. In the registration process, the registration controller 1032 presents a screen on which the user inputs a name to be assigned to the bookmark. For example, a screen showing a software keyboard as shown in FIGS. 10 and 11 is possible. The example shown in FIG. 10 is a keyboard (i) for inputting a name with Japanese letters. The example shown in FIG. 11 is a keyboard (ii) for inputting a name with Roman letters. In either case, the screens have input columns (iii) corresponding to the respective keyboards.

A process in the case of an input of the name with a voice (S402: Yes) will be described later. In the case where the input is not performed with a voice (S402: No), it is determined whether or not a name is input by the user (S407). In the case where a name is input (S407: Yes), it is determined whether the name has been already registered in the past (S408). In the case where the name has been already registered (S408: Yes), the user is asked for confirmation whether or not to overwrite (S409). In the case where the user confirms to overwrite the name for registration (S409: Yes), the name information having the name as the key is updated (S411).

In the case where the name is not registered yet (S408: No), the name information is stored in the name information storing device 107, having the input name as the key (S411). At S409, in the case where it is instructed not to overwrite (S409: No), the procedure goes back to S401.

In the case where a name is not input by the user (S407: No), the registration controller 1032 automatically generates a name which is not found in registered names (S410). A name can be automatically generated by a random number so as not to be found in registered names. After automatically generating the name, the registration controller 1032 stores the name information in the name list storing device 107, with the assigned name as the key (S411).

Hereinafter, a case where the name is input as voice information via the voice input device 102 will be described. In this case (S402: Yes), when the user speaks towards the voice input device 102, the registration controller 1032 first determines whether or not the voice pattern is already registered (S403). In the case where the voice pattern is already registered (S403: Yes), the user is asked for confirmation whether or not to overwrite (S404). In the case where the user confirms to overwrite the voice pattern for registration (S404: yes), the procedure goes to S406. In the case where the voice pattern is not registered yet (S403: No), the procedure goes to S405.

On the other hand, at S404, in the case where it is instructed not to overwrite (S404: No), the procedure goes back to S401.

At S405, the registration controller 1032 automatically generates a name in the same manner described above. Thereafter, the registration controller 1032 stores the automatically generated name and the waveform patterns of voice at that moment in the voice pattern list storing device 108 with the voice pattern list manager 1038 (S406). At the same time, the registration controller 1032 stores the name information in the name information storing device 107 with the name information manager 1037 (S411).

As the final operation of the registration process, the registration controller 1032 receives image data displayed on the screen at that moment from the output image providing part 1034, and produces snapshot information of the image, so that the snapshot information together with the name are stored in the snapshot list storing device 109 with the snapshot list manager 1039 (S412). A method for producing the snapshot information is described above.

Next, a process procedure of the controller 103 in the three-dimensional information visualizer of this embodiment in the case where the input device 101 receives an input indicating restoration of a view corresponding to an already-registered bookmark will be described below.

The process procedure of the controller 103 is performed in the same manner as shown in FIG. 2. First, the input determination process (S201) is performed by the input determining part 1031. In this case, the registration controller 1032 is notified that the input indicates restoration of the view of the registered bookmark. Then, the registration controller 1032 performs the process (S202).

Figure 5:
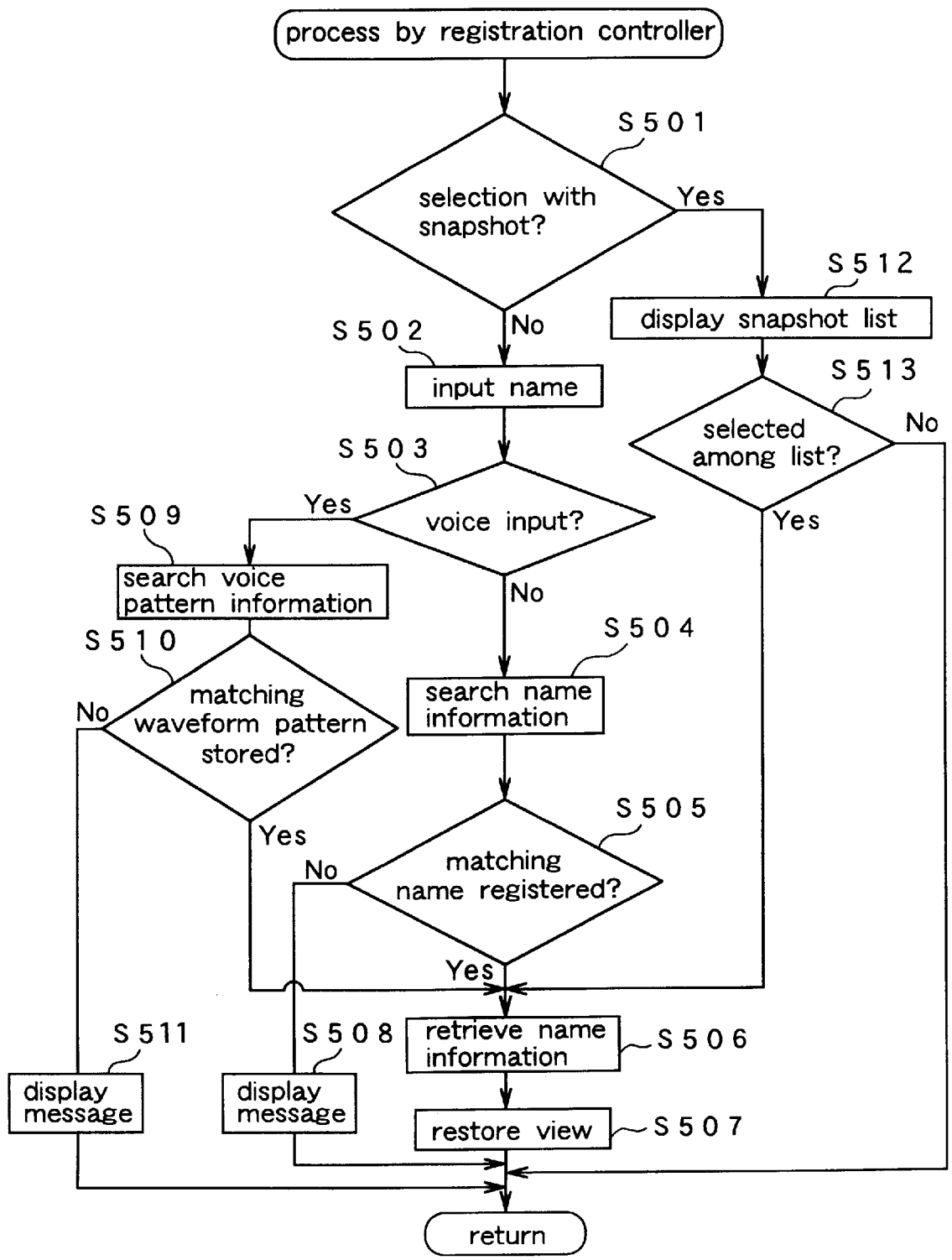
FIG. 5 is a flow chart illustrating a detailed description of a process by a registration controller, in the case where instructions to restore a view corresponding to an already-registered bookmark have been input in a three-dimensional information visualizer of the present invention.

FIG. 5 is a flow chart illustrating a detailed process procedure of the registration controller 1032, in the case where instructions of restoration of the view corresponding to a registered bookmark have been input.

Figure 12:
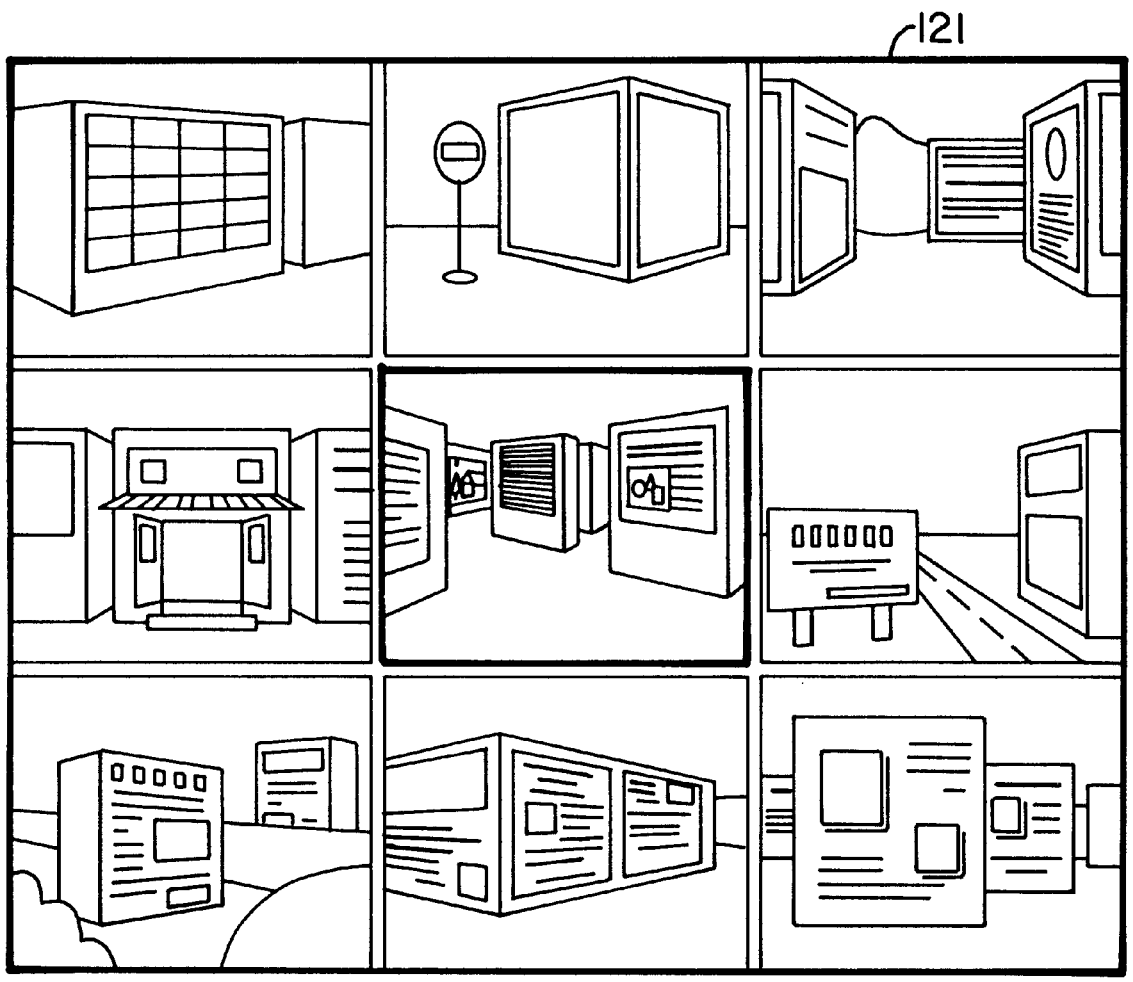
FIG. 12 is an exemplary screen on which a list of snapshots is displayed in a display device in a three-dimensional information visualizer of the present invention.

As shown in FIG. 5, the registration controller 1032 first determines whether or not it is in the mode for selection from the snapshot list (S501). In the three-dimensional information visualizer of this embodiment, the user can choose one of the following modes for selecting a registered bookmark: a mode where the screen as shown in FIGS. 10 or 11 is displayed and a name is directly input; a mode where a list of names are displayed so as to select one; and a mode where a list of snapshot information 121 as shown in FIG. 12 is displayed on the screen in the display device 104, so that the user selects one of the snapshots. A specific example of setting the mode includes a method in which an icon representing a camera is displayed on the screen, and clicking with a mouse allows for the display of the list of snapshots on the screen. The set mode is stored in a memory (not shown).

First, a process procedure in the case where the selection is not performed with the snapshots (S501: No) will be described.

The registration controller 1032 first performs the process of inputting a name (S502). More specifically, the screen of a software keyboard as shown in FIGS. 10 or 11 is displayed for the user to input a name.

First, a case where the software keyboard (i) or (ii) as shown in FIGS. 10 or 11 is provided as the input device 101, and a name is input on the screen without a voice input (S503: No) will be described. The registration controller 1032 which has received an input name searches whether or not the name information having the input name as the key is stored in the name list storing device 107 (S504).

In the case where name information having a name matching the input name is registered (S505: Yes), the registration controller 1032 retrieves the searched name information, and supplies the coordinates of the position and the vector representing the orientation of the line of sight to the output image providing part 1034 (S506). Based on the received vectors representing the coordinates of the position and the orientation of line of sight, the output image providing part 1034 retrieves three-dimensional information from the three-dimensional information storing device 106 via the three-dimensional information manager 1036. Thus, image data corresponding to the bookmark is displayed on the display device 104 so as to restore the view at the time of the registration (S507).

In the case where no name information having a name matching the input name is stored in the name list storing device 107 (S505: No), a message notifying the user thereof is displayed on the display device 104 (S508), and the view is not restored.

As described above, instructions to restore a bookmark can be input using a voice. In the case where the software keyboard is not used and a voice is input (S503: Yes), the registration controller 1032 searches whether or not a waveform matching or similar to the waveform of the voice input from the voice input device 102 is stored in the voice pattern list storing device 108 (S509). A detailed description of the comparison of the waveform patterns is omitted herein, because it is performed with a known pattern matching technique.

In the case where a voice pattern having a matching or similar waveform pattern is stored in the voice pattern list storing device 108 (S510: Yes), a name corresponding thereto is retrieved. Then, the name information having the name as the key stored in the name list storing device 107 is retrieved (S506). Thereafter, a view is restored based on the obtained name information in the same manner as in the case where an input is not performed with a voice (S507).

In the case where no voice pattern having a matching or similar waveform pattern is stored in the voice pattern list storing device 108 (S510: No), a message indicating that there is no corresponding voice pattern is displayed (S511), and subsequent processes are not performed.

At S501, in the case where a bookmark is to be selected in the mode of displaying a list of snapshots on the screen (S501: Yes), the registration controller 1032 retrieves snapshot information from the snapshot list storing device 109, and allows for the display of the list of snapshots as shown in FIG. 12 on the display device 104 (S512). In this embodiment, the registration controller 1032 retrieves not only a snapshot but also a name corresponding to the snapshot at this point.

Figure 13:
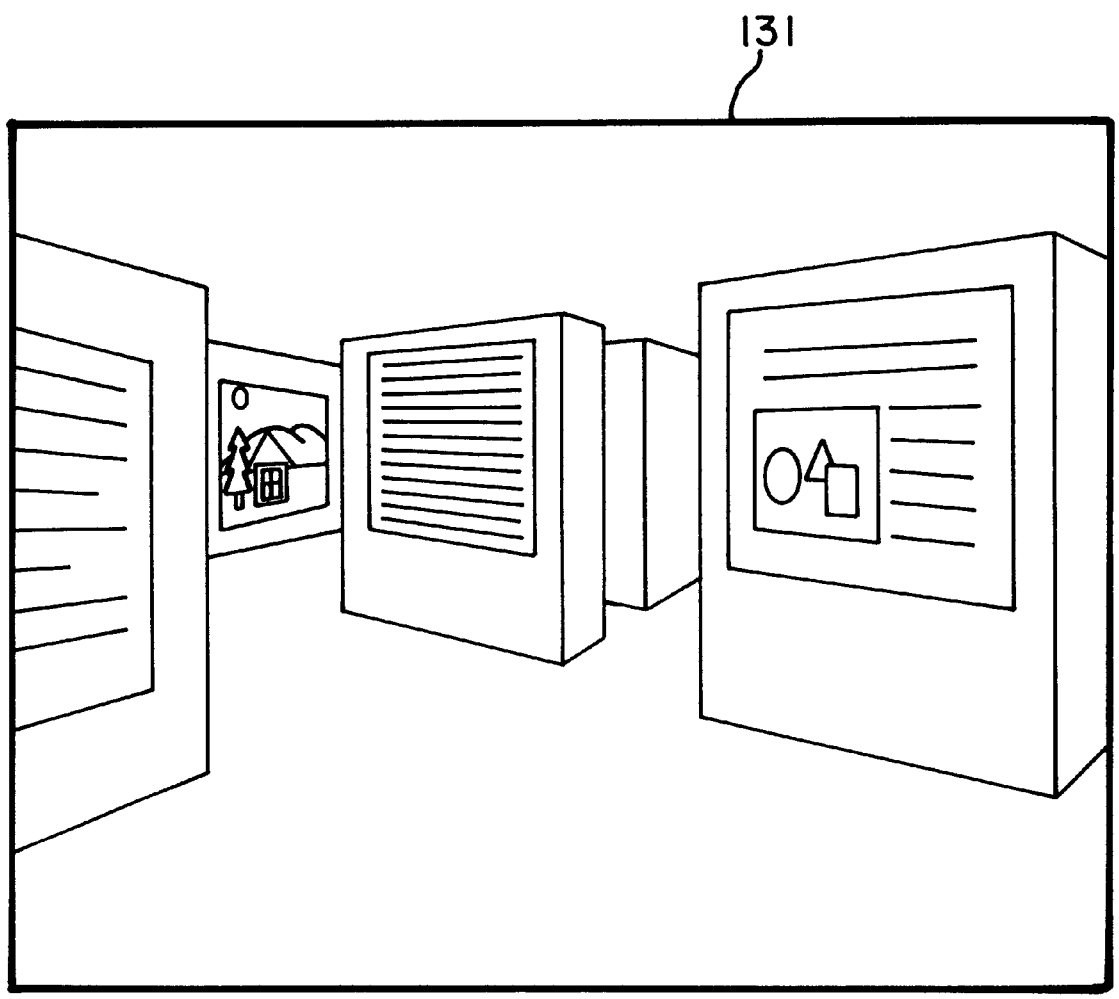
FIG. 13 is a view illustrating an exemplary restored view in a three-dimensional information visualizer of the present invention.

In the case where the user selects a snapshot on the screen (S513: Yes), the registration controller 1032 which has received instructions retrieves name information based on the name corresponding to the selected snapshot (S506), and restores a view in accordance with the obtained name information (S507). In the case where, for example, the snapshot placed in the center is selected from the list of snapshots on the screen shown in FIG. 12, the view 131 shown in FIG. 13 is restored, by performing the processes described above.

In the case where no snapshot is selected by the user (S513: No), subsequent processes are not performed.

The operation of the three-dimensional information visualizer of this embodiment having the above-mentioned structure will be described below.

In the case where the user moves in the logical three-dimensional space, the input determining part 1031 supplies information received by the input device 101 to the user position controller 1033.

The user position controller 1033 calculates the coordinates of the position and the vector representing the orientation of the line of sight of the user in the logical three-dimensional space after the move, and send them with other necessary information to the output image providing part 1034. The output image providing part 1034 retrieves three-dimensional information from the three-dimensional information storing device 106 via the three-dimensional information manager 1036 so as to generate image data to be output. The generated image data is presented on the display device 104.

In the case where, for example, the user designates a header of a document displayed on the screen and instructs so as to display a detailed content of the document, the output image providing part 1034 gets document information from the document information storing device 105 via the document information manager 1035 so as to display the document information on the display device 104.

In the case where an input received by the input device 101 indicates the registration of a bookmark, the controller 103 performs the above-mentioned processes, so that the name information, etc. are stored in the name list storing device 107, etc.

In the case where an input received by the input device 101 indicates the restoration of the view corresponding to a registered bookmark, the controller 103 performs the above-mentioned processes, so that the view at the point when the designated bookmark was registered is restored.

The user can designate a desired document from headers of documents in the restored view, or in the vicinity thereof. The term "document" used herein includes regular books, newspaper articles, electronic mails or the like. Alternatively, it is possible that the above-mentioned URL is used as a header, and that, when a header is designated in the three-dimensional space, a Web page corresponding to the URL is displayed.

A method of closely placing documents having similar contents in the three-dimensional space is a known technique (e.g., Japanese Laid-Open Patent Publication No. 9-81577). Therefore, a detailed description thereof is omitted herein.

Furthermore, although a case where one user operates a visualizer has been described in this embodiment, a plurality of users can share one visualizer. In this case, identifiers of the users are added to keys for name information, etc., and stored in the name information storing device 107, etc. The identifiers of the users can be input from the input device 101. Only in the case where the identifiers of the users match, the view can be restored.

Figure 14:
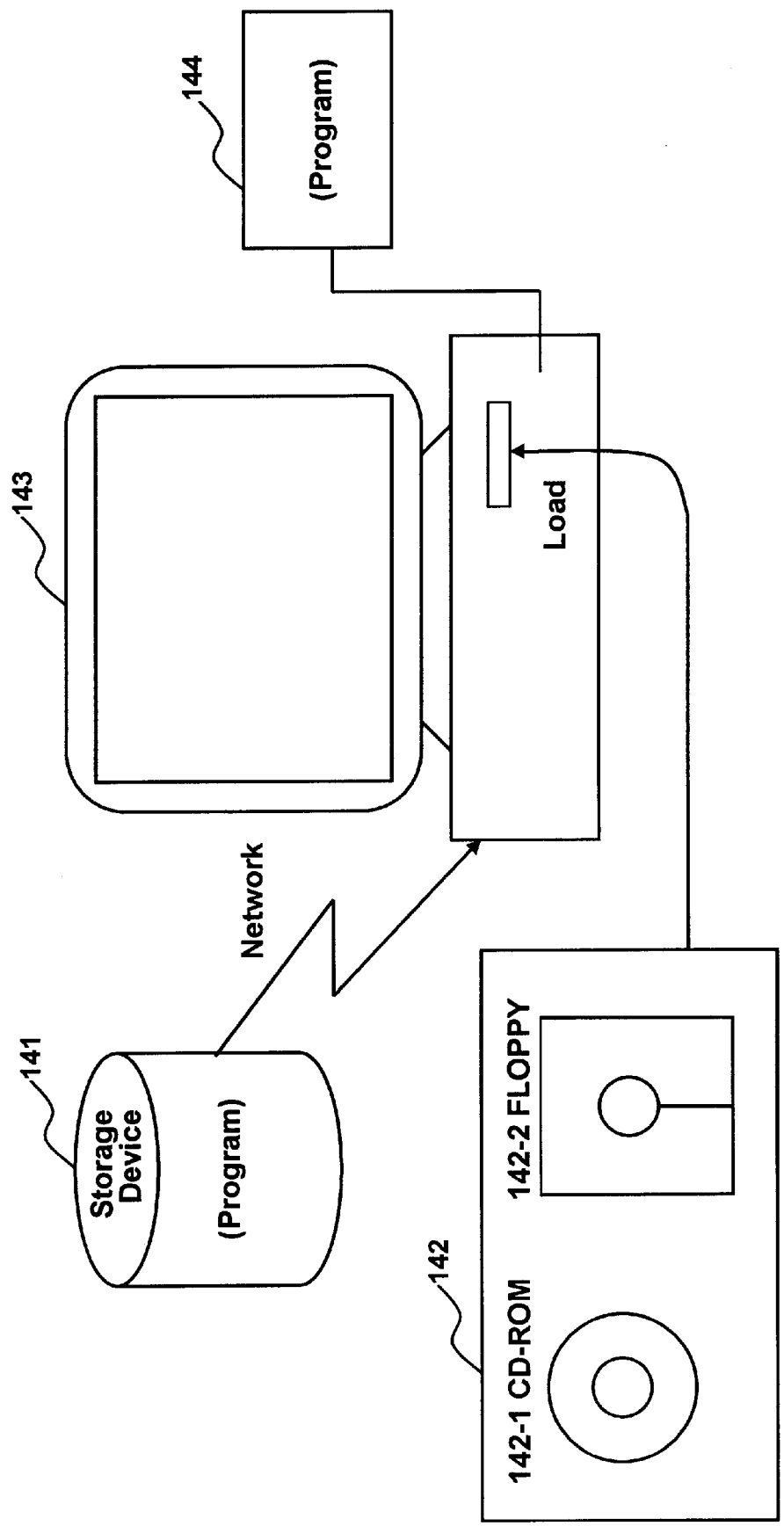
FIG. 14 is a view illustrating examples of a recording medium of the present invention.

Furthermore, the three-dimensional information visualizer of the present invention can be realized by executing computer programs realizing a series of processes including the processes described in this embodiment on a data processor. A recording medium in which programs for realizing the thee-dimensional visualizer of the present invention are recorded can be not only a transportable recording medium such as a CD-ROM, a floppy disk or the like, but also a storage device connected via wire or a recording medium such as a hard disk of a computer, a RAM or the like. In executing the programs, the programs are loaded and executed on the main memory. FIG. 14 is a view illustrating examples of a recording medium of the present invention.

As described above, the three-dimensional information visualizer of the present invention has the advantages of facilitating management of bookmarks, and saving space for storing information concerning the bookmarks.

Furthermore, by storing the identifiers of the users as information concerning the bookmarks, a plurality of users can use the same apparatus.

Furthermore, by instructing registration of a bookmark and restoration of a view with a voice, and performing selection of a desired snapshot to be restored by using a list of snapshots on the screen, the registration of the bookmark and the restoration of the view can be even more easily performed.

The invention may be embodied in other forms without departing from the spirit or essential characteristics thereof. The embodiments disclosed in this application are to be considered in all respects as illustrative and not limitative, the scope of the invention is indicated by the appended claims rather than by the foregoing description, and all changes which come within the meaning and range of equivalency of the claims are intended to be embraced therein.

What is claimed is:

1. A three-dimensional information visualizer for displaying a logical three-dimensional space on a display device for two-dimensional images, in which a user can by virtual reality move in the logical three-dimensional space and read information displayed on the logical three-dimensional space, the three-dimensional information visualizer comprising:

registration instruction input receiving means for receiving an input for instructing to register a bookmark from a user;

storing means for storing one or a plurality of information indicating a user view as bookmark information;

information acquiring means for acquiring the bookmark information at a time when the registration instruction input receiving means receives an input;

registering means for registering information acquired by the information acquiring means in the storing means; and comparing means for comparing information acquired by the information acquiring means with bookmark information already stored in the storing means, when the registration instruction input receiving means receives an input, wherein the registering means does not perform registration to the storing means, when the result from the comparison by the comparing means indicates that the difference between bookmark information already existing in the storing means and the information acquired by the information acquiring means is within a predetermined range.

2. The three-dimensional information visualizer according to claim 1 further comprising:

registration confirming means for asking the user for instruction whether or not to perform registration to the storing means, when the result from the comparison by the comparing means indicates that the difference between bookmark information already existing in the storing means and the information acquired by the information acquiring means is within a predetermined range; and registration instruction input receiving means for receiving an input of instruction of the user in response to the asking by the registration confirming means, wherein the registering means performs registration to the storing means, when the registration instruction input receiving means receives an input for instructing to register.

3. The three-dimensional information visualizer according to claim 2 further comprising:

restoration instruction input receiving means for receiving from a user an input for instructing to restore a state which is registered as a bookmark;

retrieving means for retrieving bookmark information from the storing means, when the restoration instruction input receiving means receives the input; and view restoring means for restoring a view as viewed by a user in the logical three-dimensional space on a display device at a time when the user performed registration of the bookmark, the restoration of the view being based on information retrieved by the retrieving means.

4. The three-dimensional information visualizer according to claim 3, wherein the storing means further stores identifiers of users as information concerning a bookmark, and the retrieving means retrieves bookmark information, in a case where an identifier of a user instructing registration of the bookmark matches an identifier of a user instructing restoration.

5. The three-dimensional information visualizer according to claim 4, wherein the registration instruction input receiving means receives from a user an input of a bookmark identifier particular to a bookmark to be registered, and the restoration instruction input receiving means further receives from the user an input of a bookmark identifier representing a view to be restored.

6. The three-dimensional information visualizer according to claim 5 further comprising:

voice information storing means for storing voice information representing a received voice, in a case where the registration instruction input receiving means receives a voice as an input for instructing to register a bookmark;

voice information registering means for registering the voice information representing the voice in the voice information storing means.

7. The three-dimensional information visualizer according to claim 6 further comprising:

voice information searching means for searching whether or not information matching or similar to the voice information representing a received voice is stored in the voice information storing means, in a case where the restoration instruction input receiving means receives a voice as an input for instructing restoration, wherein the retrieving means retrieves bookmark information corresponding to the matching or similar information, in a case where the matching or similar information is searched by the voice information searching means.

8. The three-dimensional information visualizer according to claim 7 further comprising:

snapshot storing means for storing information representing an output to a display device at a time when the registration instruction input receiving means receives an input for instructing registration;

snapshot registering means for registering the information representing the output in the snapshot storing means, when the registration instruction input receiving means receives the input;

snapshot list displaying means for displaying a list of information stored in the snapshot storing means on the display device; and selection input receiving means for receiving from a user an input for selection of information to be restored from the list of information.

9. The three-dimensional information visualizer according to claim 3 further comprising:

voice information storing means for storing voice information representing a received voice, in a case where the registration instruction input receiving means receives a voice as an input for instructing to register a bookmark;

voice information registering means for registering the voice information representing the voice in the voice information storing means.

10. The three-dimensional information visualizer according to claim 9 further comprising:

voice information searching means for searching whether or not information matching or similar to the voice information representing a received voice is stored in the voice information storing means, in a case where the restoration instruction input receiving means receives a voice as an input for instructing restoration, wherein the retrieving means retrieves bookmark information corresponding to the matching or similar information, in a case where the matching or similar information is searched by the voice information searching means.

11. The three-dimensional information visualizer according to claim 3, wherein the registration instruction input receiving means receives from a user an input of a bookmark identifier particular to a bookmark to be registered, and the restoration instruction input receiving means further receives an input of a bookmark identifier representing a view to be restored from the user.

12. The three-dimensional information visualizer according to claim 1 further comprising:

restoration instruction input receiving means for receiving from a user an input for instructing to restore a state which is registered as a bookmark;

retrieving means for retrieving bookmark information from the storing means, when the restoration instruction input receiving means receives the input; and view restoring means for restoring a view as viewed by a user in the logical three-dimensional space on a display device at a time when the user performed registration of the bookmark, the restoration of the view being based on information retrieved by the retrieving means.

13. A recording medium readable by a computer storing a program for a three-dimensional information visualizer for displaying a logical three-dimensional space on a display device for two-dimensional images, in which a user can by virtual reality move in the logical three-dimensional space and read information displayed on the logical three-dimensional space, comprising:

a registration instruction input receiving code segment to receive from a user an input to instruct registering a bookmark;

an information acquiring code segment to acquire information indicating a user view;

a registration code segment to register information acquired by the information acquiring code segment capable of storing in a storage device one or a plurality of sets of the information; and a comparison code segment to compare information acquired by the information acquiring code segment with bookmark information already stored in the storage device, when the registration instruction input receiving code segment receives an input, wherein the registering code segment does not perform registration to the storage devices, when the result from the comparison by the comparison code segment indicates that the difference between bookmark information already existing in the storing device and the information acquired by the information acquiring code segment is within a predetermined range.

* * * * *